(12) United States Patent
Alsaleem et al.

(10) Patent No.: US 8,996,141 B1
(45) Date of Patent: Mar. 31, 2015

(54) ADAPTIVE PREDICTIVE FUNCTIONAL CONTROLLER

(75) Inventors: Fadi Alsaleem, Sidney, OH (US); Arvind Rao, Austin, TX (US)

(73) Assignee: DunAn Microstaq, Inc., Austin, TX (US)

( * ) Notice: Subject to any disclaimer, the term of this patent is extended or adjusted under 35 U.S.C. 154(b) by 540 days.

(21) Appl. No.: 13/199,363

(22) Filed: Aug. 26, 2011

Related U.S. Application Data

(60) Provisional application No. 61/377,331, filed on Aug. 26, 2010.

(51) Int. Cl.
*G05B 13/02* (2006.01)
*G05B 13/04* (2006.01)
*F24F 11/00* (2006.01)
*F16K 99/00* (2006.01)
*G05D 7/06* (2006.01)

(52) U.S. Cl.
CPC ....... *G05B 13/048* (2013.01); *F16K 2099/0098* (2013.01); *F16K 99/0042* (2013.01); *F24F 11/008* (2013.01); *F24F 2011/0082* (2013.01); *G05D 7/0635* (2013.01); *G05D 7/0694* (2013.01)
USPC .......................................................... 700/37

(58) Field of Classification Search
None
See application file for complete search history.

(56) References Cited

U.S. PATENT DOCUMENTS

| | | |
|---|---|---|
| 668,202 A | 2/1901 | Nethery |
| 886,045 A | 4/1908 | Ehrlich et al. |
| 1,886,205 A | 11/1932 | Lyford |
| 1,926,031 A | 9/1933 | Boynton |
| 2,412,205 A | 12/1946 | Cook |
| 2,504,055 A | 4/1950 | Thomas |
| 2,651,325 A | 9/1953 | Lusignan |
| 2,840,107 A | 6/1958 | Campbell |
| 2,875,779 A | 3/1959 | Campbell |
| 3,031,747 A | 5/1962 | Green |
| 3,729,807 A | 5/1973 | Fujiwara |
| 3,747,628 A | 7/1973 | Holster et al. |
| 3,860,949 A | 1/1975 | Stoeckert et al. |
| 4,005,454 A | 1/1977 | Froloff et al. |
| 4,019,388 A | 4/1977 | Hall, II et al. |
| 4,023,725 A | 5/1977 | Ivett et al. |
| 4,100,236 A | 7/1978 | Gordon et al. |
| 4,152,540 A | 5/1979 | Duncan et al. |
| 4,181,249 A | 1/1980 | Peterson et al. |
| 4,298,023 A | 11/1981 | McGinnis |

(Continued)

FOREIGN PATENT DOCUMENTS

| | | |
|---|---|---|
| CN | 101617155 B | 3/2012 |
| DE | 2215526 | 10/1973 |

(Continued)

OTHER PUBLICATIONS

Stephan Bachmann, Electronic Expansion Valves, Danfoss A/5 (RA Marketing/5B/mwal), Jul. 2008.

(Continued)

*Primary Examiner* — Sean Shechtman
(74) *Attorney, Agent, or Firm* — MacMillan, Sobanski & Todd, LLC

(57) ABSTRACT

A controller device and a method for controlling a system that utilizes an adaptive mechanism to self-learn the system characteristics and incorporates this adaptive self-learning ability to predict a control parameter correctly to provide precise control of a system component.

17 Claims, 10 Drawing Sheets

(56) References Cited

U.S. PATENT DOCUMENTS

| | | | |
|---|---|---|---|
| 4,341,816 A | 7/1982 | Lauterbach et al. | |
| 4,354,527 A | 10/1982 | McMillan | |
| 4,434,813 A | 3/1984 | Mon | |
| 4,476,893 A | 10/1984 | Schwelm | |
| 4,543,875 A | 10/1985 | Imhof | |
| 4,581,624 A | 4/1986 | O'Connor | |
| 4,593,719 A | 6/1986 | Leonard | |
| 4,628,576 A | 12/1986 | Giachino et al. | |
| 4,647,013 A | 3/1987 | Giachino et al. | |
| 4,661,835 A | 4/1987 | Gademann et al. | |
| 4,687,419 A | 8/1987 | Suzuki et al. | |
| 4,772,935 A | 9/1988 | Lawler et al. | |
| 4,821,997 A | 4/1989 | Zdeblick | |
| 4,824,073 A | 4/1989 | Zdeblick | |
| 4,826,131 A | 5/1989 | Mikkor | |
| 4,828,184 A | 5/1989 | Gardner et al. | |
| 4,869,282 A | 9/1989 | Sittler et al. | |
| 4,938,742 A | 7/1990 | Smits | |
| 4,943,032 A | 7/1990 | Zdeblick | |
| 4,946,350 A | 8/1990 | Suzuki et al. | |
| 4,959,581 A | 9/1990 | Dantlgraber | |
| 4,966,646 A | 10/1990 | Zdeblick | |
| 5,000,009 A | 3/1991 | Clanin | |
| 5,029,805 A | 7/1991 | Albarda et al. | |
| 5,037,778 A | 8/1991 | Stark et al. | |
| 5,050,838 A | 9/1991 | Beatty et al. | |
| 5,054,522 A | 10/1991 | Kowanz et al. | |
| 5,058,856 A | 10/1991 | Gordon et al. | |
| 5,061,914 A | 10/1991 | Busch et al. | |
| 5,064,165 A | 11/1991 | Jerman | |
| 5,065,978 A | 11/1991 | Albarda et al. | |
| 5,066,533 A | 11/1991 | America et al. | |
| 5,069,419 A | 12/1991 | Jerman | |
| 5,070,706 A | 12/1991 | Waters et al. | |
| 5,074,629 A | 12/1991 | Zdeblick | |
| 5,082,242 A | 1/1992 | Bonne et al. | |
| 5,096,643 A | 3/1992 | Kowanz et al. | |
| 5,116,457 A | 5/1992 | Jerman | |
| 5,131,729 A | 7/1992 | Wetzel | |
| 5,133,379 A | 7/1992 | Jacobsen et al. | |
| 5,142,781 A | 9/1992 | Mettner et al. | |
| 5,161,774 A | 11/1992 | Engelsdorf et al. | |
| 5,169,472 A | 12/1992 | Goebel | |
| 5,176,358 A | 1/1993 | Bonne et al. | |
| 5,177,579 A | 1/1993 | Jerman | |
| 5,178,190 A | 1/1993 | Mettner | |
| 5,179,499 A | 1/1993 | MacDonald et al. | |
| 5,180,623 A | 1/1993 | Ohnstein | |
| 5,197,517 A | 3/1993 | Perera | |
| 5,209,118 A | 5/1993 | Jerman | |
| 5,215,244 A | 6/1993 | Buchholz et al. | |
| 5,216,273 A | 6/1993 | Doering et al. | |
| 5,217,283 A | 6/1993 | Watanabe | |
| 5,222,521 A | 6/1993 | Kihlberg | |
| 5,238,223 A | 8/1993 | Mettner et al. | |
| 5,244,537 A | 9/1993 | Ohnstein | |
| 5,267,589 A | 12/1993 | Watanabe | |
| 5,271,431 A | 12/1993 | Mettner et al. | |
| 5,271,597 A | 12/1993 | Jerman | |
| 5,295,360 A | 3/1994 | Olds et al. | |
| 5,309,943 A | 5/1994 | Stevenson et al. | |
| 5,310,111 A * | 5/1994 | Linck | 236/49.4 |
| 5,323,999 A | 6/1994 | Bonne et al. | |
| 5,325,880 A | 7/1994 | Johnson et al. | |
| 5,333,831 A | 8/1994 | Barth et al. | |
| 5,336,062 A | 8/1994 | Richter | |
| 5,355,712 A | 10/1994 | Petersen et al. | |
| 5,368,704 A | 11/1994 | Madou et al. | |
| 5,375,919 A | 12/1994 | Furuhashi | |
| 5,394,322 A * | 2/1995 | Hansen | 700/37 |
| 5,396,635 A * | 3/1995 | Fung | 713/323 |
| 5,400,824 A | 3/1995 | Gschwendtner et al. | |
| 5,417,235 A | 5/1995 | Wise et al. | |
| 5,445,185 A | 8/1995 | Watanabe et al. | |
| 5,458,405 A | 10/1995 | Watanabe | |
| 5,519,605 A * | 5/1996 | Cawlfield | 700/31 |
| 5,543,349 A | 8/1996 | Kurtz et al. | |
| 5,553,790 A | 9/1996 | Findler et al. | |
| 5,566,703 A | 10/1996 | Watanabe et al. | |
| 5,577,533 A | 11/1996 | Cook, Jr. | |
| 5,589,422 A | 12/1996 | Bhat | |
| 5,611,214 A | 3/1997 | Wegeng et al. | |
| 5,785,295 A | 7/1998 | Tsai | |
| 5,810,325 A | 9/1998 | Carr | |
| 5,820,262 A | 10/1998 | Lechner | |
| 5,838,351 A | 11/1998 | Weber | |
| 5,848,605 A | 12/1998 | Bailey et al. | |
| 5,856,705 A | 1/1999 | Ting | |
| 5,873,385 A | 2/1999 | Bloom et al. | |
| 5,909,078 A | 6/1999 | Wood et al. | |
| 5,926,955 A | 7/1999 | Kober | |
| 5,941,084 A | 8/1999 | Sumida et al. | |
| 5,941,608 A | 8/1999 | Campau et al. | |
| 5,954,079 A | 9/1999 | Barth et al. | |
| 5,955,817 A | 9/1999 | Dhuler et al. | |
| 5,970,998 A | 10/1999 | Talbot et al. | |
| 5,989,445 A * | 11/1999 | Wise et al. | 216/62 |
| 5,994,816 A | 11/1999 | Dhuler et al. | |
| 6,019,437 A | 2/2000 | Barron et al. | |
| 6,023,121 A | 2/2000 | Dhuler et al. | |
| 6,038,928 A | 3/2000 | Maluf et al. | |
| 6,041,650 A | 3/2000 | Swindler et al. | |
| 6,096,149 A | 8/2000 | Hetrick et al. | |
| 6,105,737 A | 8/2000 | Weigert et al. | |
| 6,114,794 A | 9/2000 | Dhuler et al. | |
| 6,116,863 A | 9/2000 | Ahn et al. | |
| 6,123,316 A | 9/2000 | Biegelsen et al. | |
| 6,124,663 A | 9/2000 | Haake et al. | |
| 6,171,972 B1 | 1/2001 | Mehregany et al. | |
| 6,182,742 B1 | 2/2001 | Takahashi et al. | |
| 6,224,445 B1 | 5/2001 | Neukermans et al. | |
| 6,255,757 B1 | 7/2001 | Dhuler et al. | |
| 6,279,606 B1 | 8/2001 | Hunnicutt et al. | |
| 6,283,441 B1 | 9/2001 | Tian | |
| 6,318,101 B1 | 11/2001 | Pham et al. | |
| 6,321,549 B1 | 11/2001 | Reason et al. | |
| 6,386,507 B2 | 5/2002 | Dhuler et al. | |
| 6,390,782 B1 | 5/2002 | Booth et al. | |
| 6,408,876 B1 | 6/2002 | Nishimura et al. | |
| 6,494,804 B1 | 12/2002 | Hunnicutt et al. | |
| 6,505,811 B1 | 1/2003 | Barron et al. | |
| 6,520,197 B2 | 2/2003 | Deshmukh et al. | |
| 6,523,560 B1 | 2/2003 | Williams et al. | |
| 6,533,366 B1 | 3/2003 | Barron et al. | |
| 6,540,203 B1 | 4/2003 | Hunnicutt | |
| 6,581,640 B1 | 6/2003 | Barron | |
| 6,637,722 B2 | 10/2003 | Hunnicutt | |
| 6,662,581 B2 | 12/2003 | Hirota et al. | |
| 6,694,998 B1 | 2/2004 | Hunnicutt | |
| 6,724,718 B1 | 4/2004 | Shinohara et al. | |
| 6,751,510 B1 * | 6/2004 | Tan et al. | 700/41 |
| 6,755,761 B2 | 6/2004 | Hunnicutt et al. | |
| 6,761,420 B2 | 7/2004 | Maluf et al. | |
| 6,845,962 B1 | 1/2005 | Barron et al. | |
| 6,872,902 B2 | 3/2005 | Cohn et al. | |
| 6,902,988 B2 | 6/2005 | Barge et al. | |
| 6,917,838 B2 * | 7/2005 | Kruger et al. | 700/28 |
| 6,958,255 B2 | 10/2005 | Khuri-Yakub et al. | |
| 6,966,329 B2 | 11/2005 | Liberfarb | |
| 7,011,378 B2 | 3/2006 | Maluf et al. | |
| 7,063,100 B2 | 6/2006 | Liberfarb | |
| 7,210,502 B2 | 5/2007 | Fuller et al. | |
| 7,216,164 B1 * | 5/2007 | Whitmore et al. | 709/224 |
| 7,372,074 B2 | 5/2008 | Milne et al. | |
| 7,449,413 B1 | 11/2008 | Achuthan et al. | |
| 7,451,004 B2 * | 11/2008 | Thiele et al. | 700/28 |
| 8,113,448 B2 | 2/2012 | Keating | |
| 8,113,482 B2 | 2/2012 | Hunnicutt | |
| 8,156,962 B2 | 4/2012 | Luckevich | |
| 2002/0014106 A1 | 2/2002 | Srinivasan et al. | |
| 2002/0029814 A1 | 3/2002 | Unger et al. | |
| 2002/0091493 A1* | 7/2002 | Christopher et al. | 702/113 |
| 2002/0096421 A1 | 7/2002 | Cohn et al. | |
| 2002/0100462 A1* | 8/2002 | Yang et al. | 123/568.16 |

(56) References Cited

U.S. PATENT DOCUMENTS

| | | | |
|---|---|---|---|
| 2002/0157409 A1* | 10/2002 | Pham et al. | 62/228.3 |
| 2002/0173309 A1* | 11/2002 | Shahidi et al. | 455/442 |
| 2002/0174891 A1 | 11/2002 | Maluf et al. | |
| 2003/0061889 A1 | 4/2003 | Tadigadapa et al. | |
| 2003/0098612 A1 | 5/2003 | Maluf et al. | |
| 2003/0159811 A1 | 8/2003 | Nurmi | |
| 2003/0206832 A1 | 11/2003 | Thiebaud et al. | |
| 2004/0115905 A1 | 6/2004 | Barge et al. | |
| 2005/0121090 A1 | 6/2005 | Hunnicutt | |
| 2005/0200001 A1 | 9/2005 | Joshi et al. | |
| 2005/0205136 A1 | 9/2005 | Freeman | |
| 2006/0017125 A1 | 1/2006 | Lee et al. | |
| 2006/0067649 A1 | 3/2006 | Tung et al. | |
| 2006/0218953 A1 | 10/2006 | Hirota | |
| 2007/0237686 A1* | 10/2007 | Mathies et al. | 422/103 |
| 2007/0251586 A1 | 11/2007 | Fuller et al. | |
| 2007/0276512 A1* | 11/2007 | Fan et al. | 700/37 |
| 2007/0289941 A1 | 12/2007 | Davies | |
| 2008/0028779 A1 | 2/2008 | Song | |
| 2008/0072977 A1 | 3/2008 | George et al. | |
| 2008/0084712 A1* | 4/2008 | Wang et al. | 363/21.01 |
| 2008/0229770 A1 | 9/2008 | Liu | |
| 2008/0250870 A1* | 10/2008 | Rhodes | 73/861.27 |
| 2008/0271788 A1 | 11/2008 | Matsuzaki et al. | |
| 2009/0076749 A1* | 3/2009 | Nasle | 702/62 |
| 2009/0123300 A1 | 5/2009 | Uibel | |
| 2009/0125285 A1* | 5/2009 | Gugaliya et al. | 703/2 |
| 2009/0186466 A1 | 7/2009 | Brewer | |
| 2009/0319060 A1* | 12/2009 | Wojsznis et al. | 700/30 |
| 2010/0019177 A1 | 1/2010 | Luckevich | |
| 2010/0038576 A1 | 2/2010 | Hunnicutt | |
| 2010/0204840 A1 | 8/2010 | Sun et al. | |
| 2010/0225708 A1 | 9/2010 | Peng et al. | |
| 2010/0226637 A1* | 9/2010 | Kanda et al. | 396/133 |
| 2010/0280731 A1* | 11/2010 | Snider | 701/100 |
| 2011/0169488 A1* | 7/2011 | Mather | 324/252 |
| 2011/0192224 A1 | 8/2011 | Vonsild et al. | |
| 2011/0222576 A1 | 9/2011 | Vonsild et al. | |
| 2011/0320743 A1* | 12/2011 | Hagspiel et al. | 711/154 |
| 2012/0000550 A1 | 1/2012 | Hunnicutt et al. | |

FOREIGN PATENT DOCUMENTS

| | | |
|---|---|---|
| DE | 2930779 | 2/1980 |
| DE | 3401404 | 7/1985 |
| DE | 4101575 | 7/1992 |
| DE | 4417251 | 11/1995 |
| DE | 4422942 | 1/1996 |
| EP | 250948 | 1/1988 |
| EP | 261972 | 3/1988 |
| EP | 1024285 | 8/2000 |
| GB | 2238267 | 5/1991 |
| JP | 39-990 | 2/1964 |
| JP | 04-000003 | 1/1992 |
| JP | 06-117414 | 4/1994 |
| JP | 2001184125 | 7/2001 |
| JP | 2003-049933 | 2/2003 |
| JP | 63-148062 | 7/2003 |
| JP | 2006-080194 | 3/2006 |
| WO | 99/16096 A1 | 4/1999 |
| WO | 99/24783 A1 | 5/1999 |
| WO | 00/14415 A2 | 3/2000 |
| WO | 00/14415 A3 | 7/2000 |
| WO | 2005/084211 A2 | 9/2005 |
| WO | 2005/084211 A3 | 1/2006 |
| WO | 2006/076386 A1 | 7/2006 |
| WO | 2008/076388 A1 | 6/2008 |
| WO | 2008/073688 B1 | 8/2008 |
| WO | 2008/121365 A1 | 10/2008 |
| WO | 2008/121369 A1 | 10/2008 |
| WO | 2010/019329 A2 | 2/2010 |
| WO | 2010/019329 A3 | 2/2010 |
| WO | 2010/019665 A2 | 2/2010 |
| WO | 2010/019665 A3 | 2/2010 |
| WO | 2010/065804 A2 | 6/2010 |
| WO | 2010/065804 A3 | 6/2010 |
| WO | 2011/022267 A2 | 2/2011 |
| WO | 2011/022267 A3 | 2/2011 |
| WO | 2011/094032 A3 | 8/2011 |
| WO | 2011/094300 A2 | 8/2011 |
| WO | 2011/094300 A3 | 8/2011 |
| WO | 2011/094302 A2 | 8/2011 |

OTHER PUBLICATIONS

C. Changenet et al., Study on Predictive Functional Control of an Expansion Valve for Controlling the Evaporator Superheat, Proc. IMechE vol. 222 Part I; Journal of Systems and Control Engineering, May 28, 2008.

John Tomczyk, Electronic Expansion Valves: The Basics, Internet Article, Jul. 28, 2004.

Unpublished U.S. Appl. No. 09/309,316, incorporated by reference at col. 4, Line 30, of U.S. Patent No. 6,520,197, which Patent has prior pub. as U.S. Patent Application Pub. No. US 2001/0055242A1, pub. Dec. 27, 2001.

Ayon et al., "Etching Characteristics and Profile Control in a Time Multiplexed ICP Etcher," Proc. of Solid State Sensor and Actuator Workshop Technical Digest, Hilton Head SC, (Jun. 1998) 41-44.

Bartha et al., "Low Temperature Etching of Si in High Density Plasma Using SF6/02," Microelectronic Engineering, and Actuator Workshop Technical Digest, Hilton Head SC, (Jun. 1998) 41-44.

Booth, Steve and Kaina, Rachid, Fluid Handling—Big Gains from Tiny Valve, Appliance Design (Apr. 2008), pp. 46-48.

Controls Overview for Microstaq Silicon Expansion Valve (SEV), Rev. 1, Dec. 2008 [online], [retrieved May 17, 2010]. Retrieved from the Internet <URL: http://www.microstaq.com/pdf/SEV_controls.pdf>.

Copeland, Michael V., Electronic valves promise big energy savings, FORTUNE, Sep. 9, 2008 [online], [retrieved Sep. 9, 2008]. Retrieved from the internet <URL: http://techland.blogs.fortune.cnn.com/2008/09/09/electronic-valves-promise-big-energy-savings>.

Fung et al., "Deep Etching of Silicon Using Plasma" Proc. of the Workshop on Micromachining and Micropackaging of Transducers, (Nov. 7-8, 1984) pp. 159-164.

Gui, C. et al, "Selective Wafer Bonding by Surface Roughness Control", Journal of the Electrochemical Society, 148 (4) G225-G228 (2001).

Gui, C. et al., "Fusion bonding of rough surfaces with polishing technique for silicon micromachining", Microsystem Technologies (1997) 122-128.

Günther, Götz, "Entwicklung eines pneumatischen 3/2-Wege-Mikroventils", O + P Olhydraulik Und Pneumatik, Vereinigt Fachverlage, Mainz, DE, vol. 42, No. 6, Jun. 1, 1998, pp. 396-398, XP000831050, ISSN: 0341-2660.

Higginbotham, Stacey, Microstaq's Tiny Valves Mean Big Energy Savings [online], [retrieved Dec. 8, 2008]. Retrieved from the Internet <URL: http//earth2tech.com/2008/09/09/microstaqs-tiny-valves-mean-big-energy savings (posted Sep. 9, 2008)>.

J. Mark Noworolski, et al.,"Process for in-plane and out-of-plane single-crystal-silicon thermal microactuatos", Sensors and Actuators A 55 (1996); pp. 65-69.

Jonsmann et al., "Compliant Electra-thermal Microactuators", IEEE Technical Digest , Twelfth IEEE International Conference on Micro Electro Mechanical Systems Jan. 17-21, 1999, Orlando, Florida, pp. 588-593, IEEE Catalog No. 99CH36291C.

K.R. Williams et al., "A Silicon Microvalve for the Proportional Control of Fluids", Transducers '99, Proc. 10th International Conference on Solid State Sensors and Actuators, held Jun. 7-10, 1999, Sendai, Japan, pp. 18-21.

Keefe, Bob, Texas firm says value-replacing chip can drastically cut energy use, Atlanta Metro News, Sep. 10, 2008 [online], [retrieved Sep. 10, 2008]. Retrieved from the Internet <URL: http://www.ajc.com/search/content/shared/money/stories/2008/09/microstaq10_cox-F9782.html>.

Klaassen et al., "Silicon Fusion Bonding and Deep Reactive Ion Etching; A New Technology for Microstructures," Proc., Transducers 95 Stockholm Sweden, (1995) 556-559.

(56) References Cited

OTHER PUBLICATIONS

Linder et al., "Deep Dry Etching Techniques as a New IC Compatible Tool for Silicon Micromachining," Proc, Transducers, vol. 91, (Jun. 1991) pp. 524-527.

Luckevich, Mark, MEMS microvlaves: the new valve world, Valve World (May 2007), pp. 79-83.

MEMS, Microfluidics and Microsystems Executive Review [online], Posted Apr. 16, 2009. [retrieved May 17, 2010]. Retrieved from the Internet <URL: http:www.memsinvestorjournal.com/2009/04/mems-applications-for-flow-control.html>.

Microstaq Announces High Volume Production of MEMS-Based Silicon Expansion Valve [onlne], [retrieved Jan. 27, 2010]. Retrieved from the Internet <URL: http://www.earthtimes.org/articles/printpressstory.php?news+1138955 (posted Jan. 27, 2010)>.

Microstaq Product Descriptions, SEV, CPS-4, and PDA-3 [online], Published 2009, [retrieved May 17, 2010]. Retrieved from the Internet <URL: http://www.microstaq.com/products/index.html>.

Microstaq Product Description, Proportional Direct Acting Silicon Control Valve (PDA-3) [online], Published 2008, [retrieved May 17, 2010]. Retrieved from the Internet <URL: http://www.microstaq.com/products/pda3.html>.

Microstaq Product Description, Proportional Piloted Silicon Control Valve (CPS-4) [online], Published 2008, [retrieved May 17, 2010]. Retrieved from the Internet <URL: http://www.microstaq.com/products/cps4.html>.

Microstaq Technology Page [online], Published 2008, [retrieved May 17, 2010]. Retrieved from the Internet <URL: http://www.microstaq.com/technology/index.html>.

Petersen et al. "Surfaced Micromachined Structures Fabricated with Silicon Fusion Bonding" Proc., Transducers 91, (Jun. 1992) pp. 397-399.

Press Release, Freescale and Microstaq Join Forces on Smart Superheat Control System for HVAC and Refrigeration Efficiency (posted Jan. 22, 2008) [online], [retrieved May 17, 2010]. Retrieved from the Internet <URL: http://www.microstaq.com/pressReleases/prDetail_04.html>.

Press Release, Microstaq Unveils Revolutionary Silicon Expansion Valve at Demo 2008 [online], [retrieved May 17, 2010]. Retrieved from the Internet <URL: http://www.microstaq.com/pressReleases/prDetail_05.html (posted Sep. 8, 2008)>.

Press Release, Microstaq Mastering Electronic Controls for Fluid-Control Industry (posted May 5, 2005) [online[, [retrieved May 17, 2010]. Retrieved from the Internet <URL: http://www.microstaq.com/pressReleases/prDetail_02.html>.

Press Release, Nanotechnology Partnerships, Connections Spur Innovation for Fluid Control Industries (posted Jun. 9, 2005) [online], [retrieved May 17, 2010]. Retrieved from the Internet <URL: http://www.microstaq.com/pressReleases/prDetail_03.html>.

Product Review, greentechZONE Products for the week of May 18, 2009 [online], [retrieved May 17, 2010]. Retrieved from the Internet <URL: http://www.en-genius.net/site/zones/greentechZONE/product_reviews/grnp_051809>.

SEV Installation Instructions [online], [retrieved May 17, 2010]. Retrieved from the Internet <URL: http://www.microstaq.com/pdf/SEV_Instruction_sheet.pdf>.

Silicon Expansion Valve Information Sheet [online], [retrieved May 17, 2010]. Retrieved from the Internet <URL: http://www.microstaq.com/pdf/SEV_Infosheet_2_0.pdf>.

Silicon Expansion Valve (SEV)—for Heating, Cooling, and Refrigeration Applications [online], [retrieved May 17, 2010]. Retrieved from the Internet <URL: http://www.microstaq.com/pdf/SEV_Quicksheet.pdf>.

Silicon Expansion Valve Data Sheet [online], [retrieved May 17, 2010]. Retrieved from the Internet <URL: http://www.microstaq.com/pdf/SEV_Datasheet_1_8.pdf>.

SMIC Announces Successful Qualification of a MEMS Chip for Microstaq (posted Oct. 26, 2009) [online], [retrieved May 17, 2010]. Retrieved from the Internet <URL: http://www.prnewswire.com/news-releases/smic-announces-successful-qualification-of-a-mems-chip-for-microstaq-65968252.html (posted Oct. 26, 2009)>.

SMIC quals Microstaq MEMS chip for fluid control (posted Oct. 26, 2009) [online], [retrieved May 17, 2010]. Retrieved from the Internet <URL: http://www.electroiq.com/ElectroiQ/en-us/index/display/Nanotech_Article_Tools_Template.articles.small-times.nanotechmems.mems.microfluidics.2009.10.smic-quals_microstaq.html>.

Tiny Silicon Chip Developed by Microstaq Will Revolutionize Car Technology (posted May 19, 2005) [online], [retrieved May 19, 2005]. Retrieved from the Internet <URL: http:www.nsti.org/press/PRshow.html?id=160>.

Turpin, Joanna R., Soft Economy, Energy Prices Spur Interest in Technologies [online], Published Dec. 8, 2008. [retrieved May 18, 2010]. Retrieved from the Internet <URL: http://www.achrnews.com/copyright/BNP_GUID_9-5-2006_A_10000000000000483182>.

Uibel, Jeff, The Miniaturization of Flow Control (Article prepared for the 9th International Symposium on Fluid Control Measurement and Visualization (FLUCOME 2007)), Journal of Visualization (vol. 11, No. 1, 2008), IOS Press.

Yunkin et al., "Highly Anisotropic Selective Reactive Ion Etching of Deep Trenches in Silicon," Microelectronic Engineering, Elsevier Science B.V., vol. 23, (1994) pp. 373-376.

Zhixiong Liu et al., "Micromechanism fabrication using silicon fusion bonding", Robotics and Computer Integrated Manufacturing 17 (2001) 131-137.

Biography, Ohio State University Website [online], [retrieved Dec. 31, 2000]. Retrieved from the Internet <URL: http://www.chemistry.ohio-state.edu/resource/pubs/brochure/madou.htm>.

Madou, Marc, "Fundamentals of Microfabrication", Boca Raton: CRC Press, 1997, 405-406.

\* cited by examiner

COMPUTE
MODEL
SUBROUTINE

STABILITY SUBROUTINE

| Condition | Outdoor temp (C) | Indoor Temp (C) | Outdoor Humidity | Indoor Humidity |
|---|---|---|---|---|
| 1 | 35 | 25 | 15% | 38% |
| 2 | 46 | 29 | 15% | 38% |
| 3 | 46 | 29 | 40% | 38% |
| 4 | 46 | 29 | 70% | 38% | sample of the results for ↑θ⚹ unit for different load conditions and set points (using only the predictive adaptive controller)

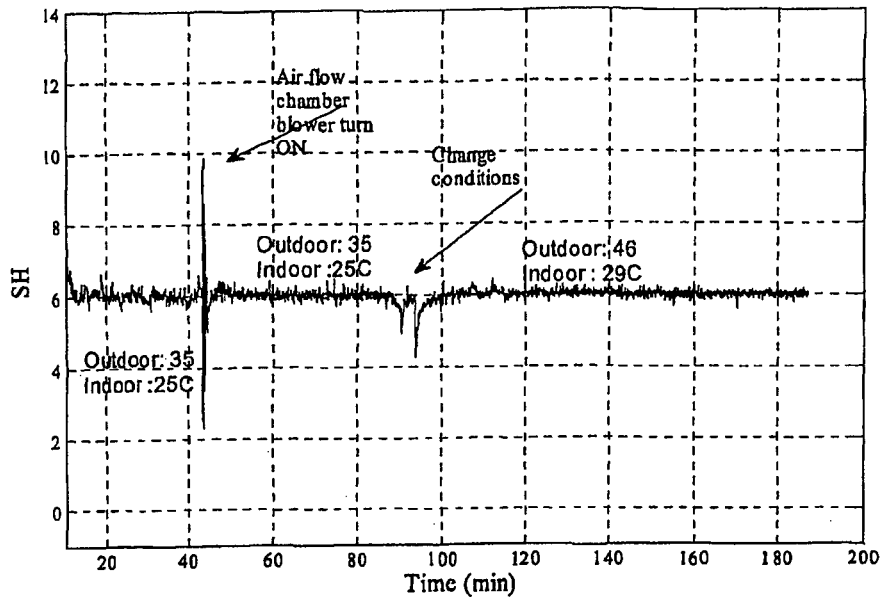
(a) Superheat
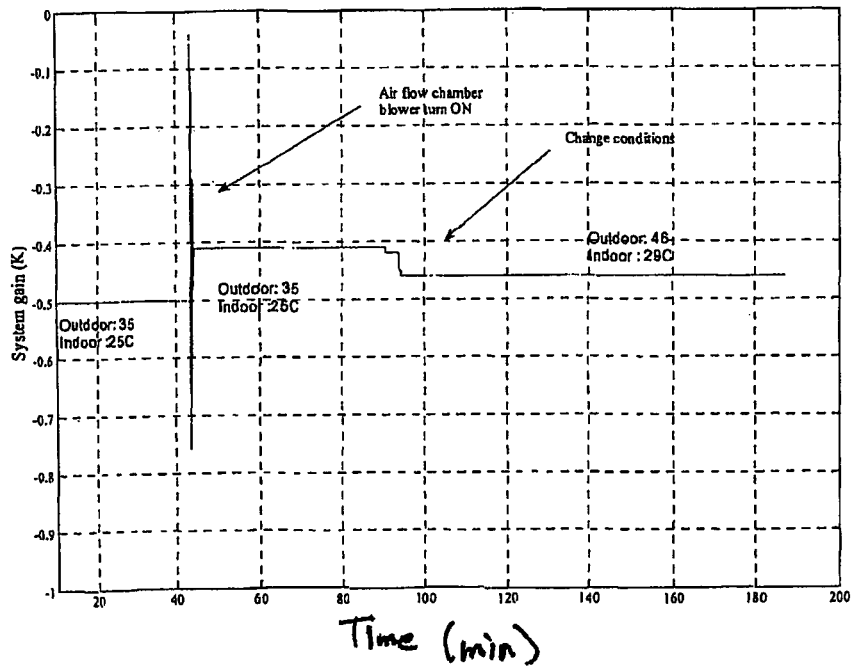
(b) The system gain estimated by the self learning algorithum
FIG. 8

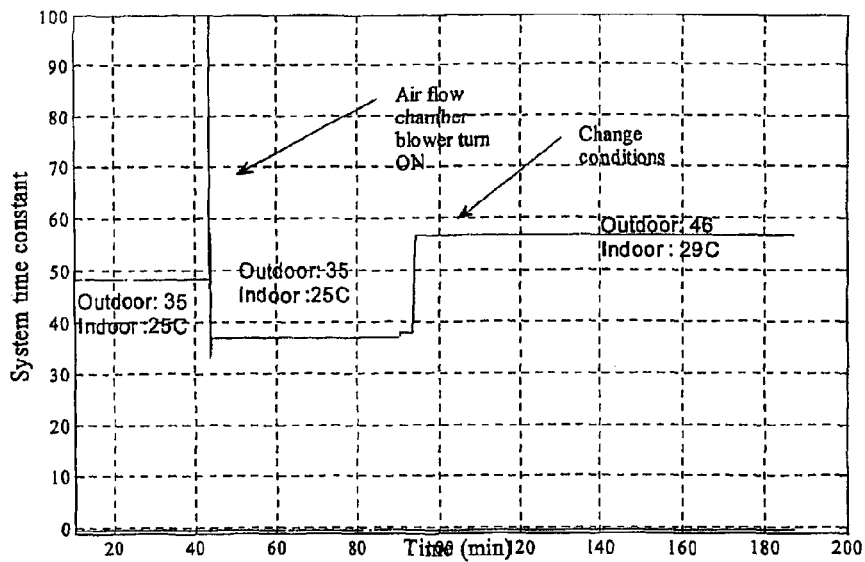

(c) The system tiem constant estimated by the self learning algorithum the model parameters change as needed to cope with the new conditions

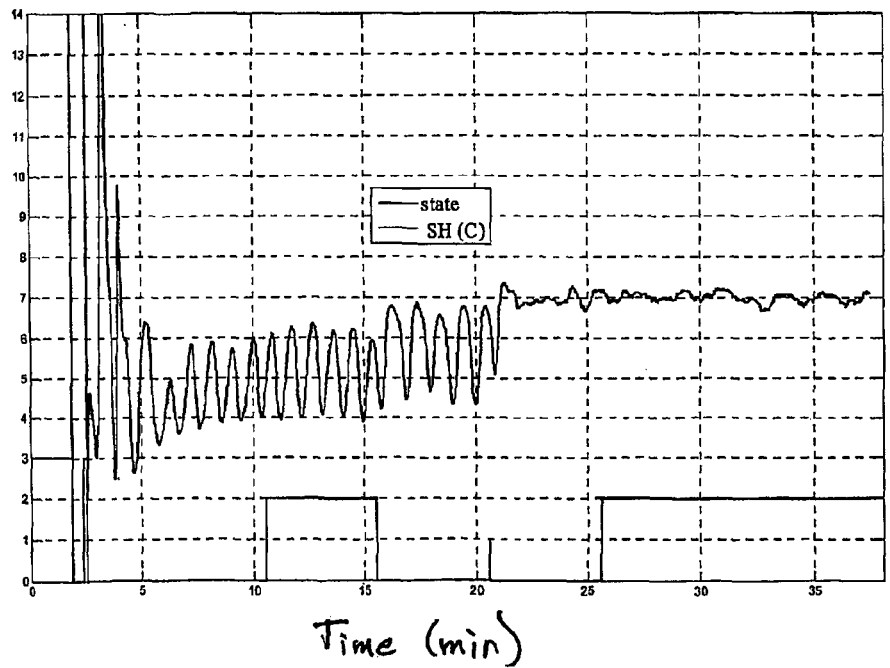

sample of the results for test unit with predictive adaptive controller with the adjustable superheat set point. The new controller was able to search for a stable superheat point and also to find the right controller gain to ensure its stability.

FIG. 9

Figure 6: sample of the results for test unit with predictive adaptive controller with the adjustable superheat set point. The controller was able to reduce the superheat set point while maintain a stable response about the new set point.

ADAPTIVE PREDICTIVE FUNCTIONAL CONTROLLER

CROSS REFERENCE TO RELATED APPLICATIONS

This application claims the benefit of U.S. Provisional Patent Application No. 61/377,331, filed Aug. 26, 2010, the disclosures of which are incorporated by reference herein.

BACKGROUND OF THE INVENTION

This invention relates in general to systems and in particular to a method for controlling such systems.

One example of a common system that needs control is a Heating, Ventilating and Air Conditioning (HVAC) system, which is actually a flow conducting system. A typical HVAC system includes either an expansion valve or a fixed orifice valve that modulates refrigerant flow from a condenser to an evaporator in order to maintain enough suction superheat to prevent any un-evaporated refrigerant liquid from reaching the system compressor. This is done by controlling the mass flow of refrigerant entering the evaporator so that it equals the rate at which it can be completely vaporized in the evaporator by absorption of heat. In the past, capillary tubes and thermostatic expansion valves have been widely used in refrigerating machines as refrigerant flow regulating devices. Now Electrically or Electronically driven Expansion Valves (EEVs) are commonly utilized and permit more advanced control. However, with this type of regulating device, it becomes necessary to choose a control algorithm.

Referring now to FIG. 1, there is shown a typical HVAC system 10 that includes two shell and tube heat exchangers that function as an evaporator 12 and a condenser 14, respectively, and a reciprocating compressor 16. As shown in FIG. 1, the evaporator 12 is used with a flow of water and antifreeze mixture as a secondary refrigerant fluid, whereas the condenser 14 is water cooled. The refrigerant fluid is vaporized inside tubes disposed within the evaporator 12, while its condensation occurs outside the tube bundle in the condenser 14. The refrigerant travels about a closed loop that is labeled 18. The flow of the refrigerant is controlled by an EEV 20. Air to be cooled is forced through the evaporator 12 by a blower 22 connected to an intake vent 24. The cooled air is discharged through a discharge vent 26. Typically, ductwork (not shown) routes the air before and after passage through the evaporation 12.

In the past, the EEV 20 has been an electronic valve controlled by the displacement of a magnet in a magnetic field created by a coil. The displacement of the magnet induced a linear movement of the needle and, consequently, a proportional throttling of the valve. The EEV 20 typically had a precise positioning control loop with a stroke resolution of up to 1:1000 and a positioning time that may be as fast as less than one second. The control signal needed to operate this valve was usually obtained by a package that contained a PID controller and a pressure and temperature sensor. More recently, micro-valve arrays, such as those available from DunAn Microstaq, Inc., of Austin, Tex., have been substituted for the EEVs to achieve energy savings through more precise and rapid control of superheat.

The differences among the micro-valve systems are based upon geometry, actuation mechanisms, membrane material, flow path design and fabrication techniques. Among these differences, the actuation mechanism is the most commonly used property to classify the micro-valve systems. For multi channel applications, micro-valve arrays are used. With micro-valve arrays, more precise flow is achievable since flow regulation is easier with an array than one valve. Another advantage of micro-valve arrays is they also have a relatively low cost.

Micro-valves may be micro-machined from silicon; however, other materials also may be used. Silicon has many advantages for MEMS (micro-electrical mechanical system) applications. It is one of very few materials that can be economically manufactured in single crystal substrates. Its crystalline nature provides significant electrical and mechanical advantages. Besides, silicon is abundant and can be produced in high purity and is an elastic and robust material. Good sealing properties make silicon the most used material for micro-valve applications. In particular, spin-on silicone rubber is very attractive for micro-valve applications since it has low modulus, high elongation, good compatibility with IC processes, and good sealing properties. Glass, polymers, and thin metal films such as Ni, Ti, Fe, and Cu may also used in micro-valve fabrication.

The use of micro-valves has enabled more precise operation of the control systems for HVAC systems. However, difficulty of controlling the superheat in HVAC systems continues to be experienced as thermal load on the HVAC system changes due to changing environmental conditions. Accordingly, it would be desirable to provide a stable control algorithm for micro-valves in HVAC systems that would compensate for thermal load changes.

BRIEF DESCRIPTION OF THE DRAWINGS

FIG. 8 is two graphs illustrating an application of the HVAC system controller shown in FIG. 2 to an HVAC system.

FIG. 9 is two graphs illustrating an application of the HVAC system controller shown in FIG. 2 to an HVAC system.

DETAILED DESCRIPTION OF THE PREFERRED EMBODIMENT

The present invention is directed toward the application of a predictive controller that is combined with a self learning mechanism to provide precise control of fluid flow, and further toward an associated method of control of a valve. In order to describe the invention, the control of superheat in an HVAC system with one or more microvalves is used as an illustrative example. However, it will be appreciated that the predictive controller system and method for control described and illustrated herein are intended to be utilized to control other valves than microvalves and are not limited to use in HVAC systems. Indeed, the predictive controller system and method for control may be used in the control of electronically controlled valves in a variety of applications, including flow control and pressure control. With regard to HVAC systems, one application could be to help ensure that the superheat set point is appropriate for the system using an intelligent self-correcting algorithm.

Figure 1:
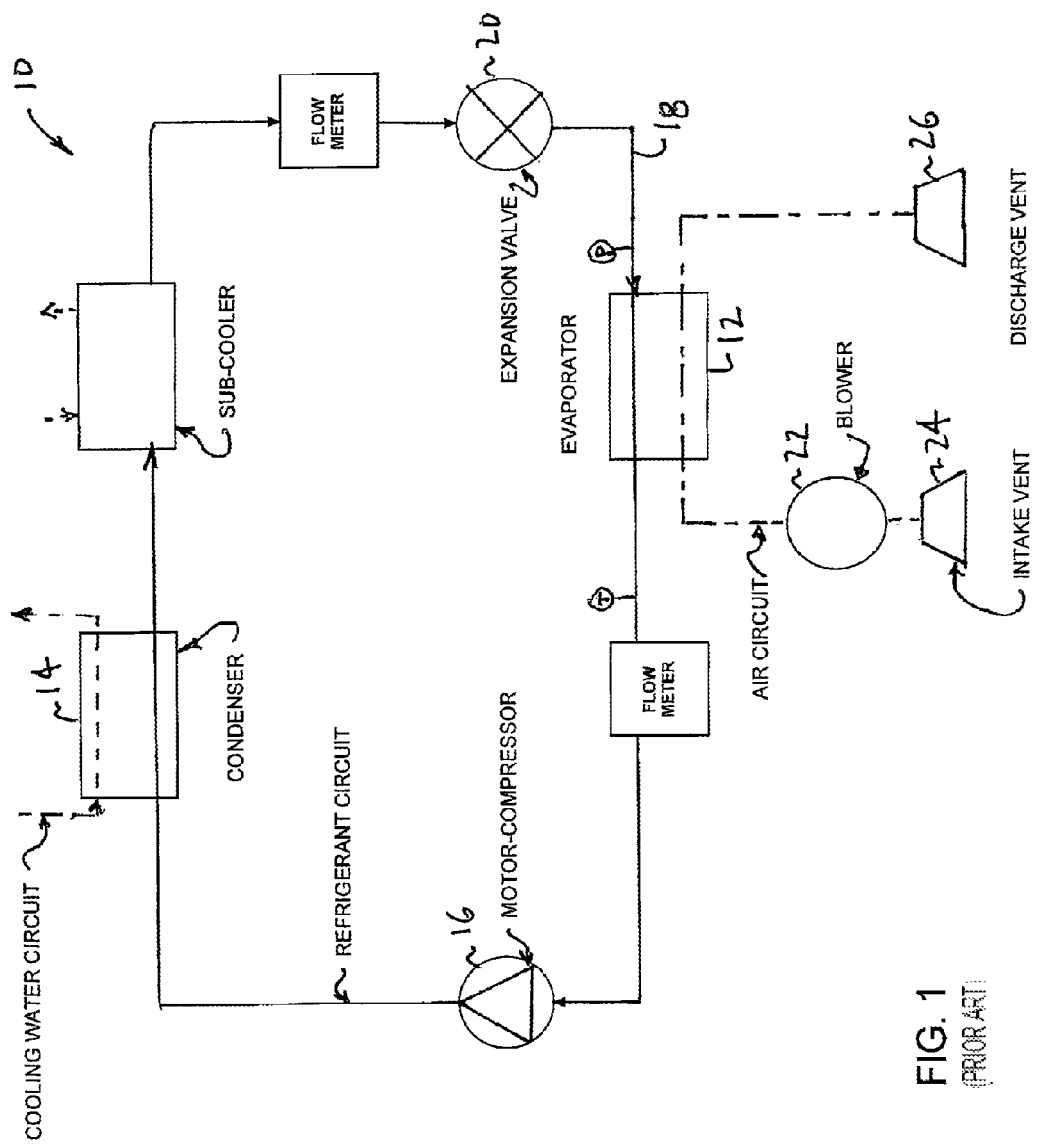
FIG. 1 is a schematic diagram of a typical HVAC system.
Figure 2:
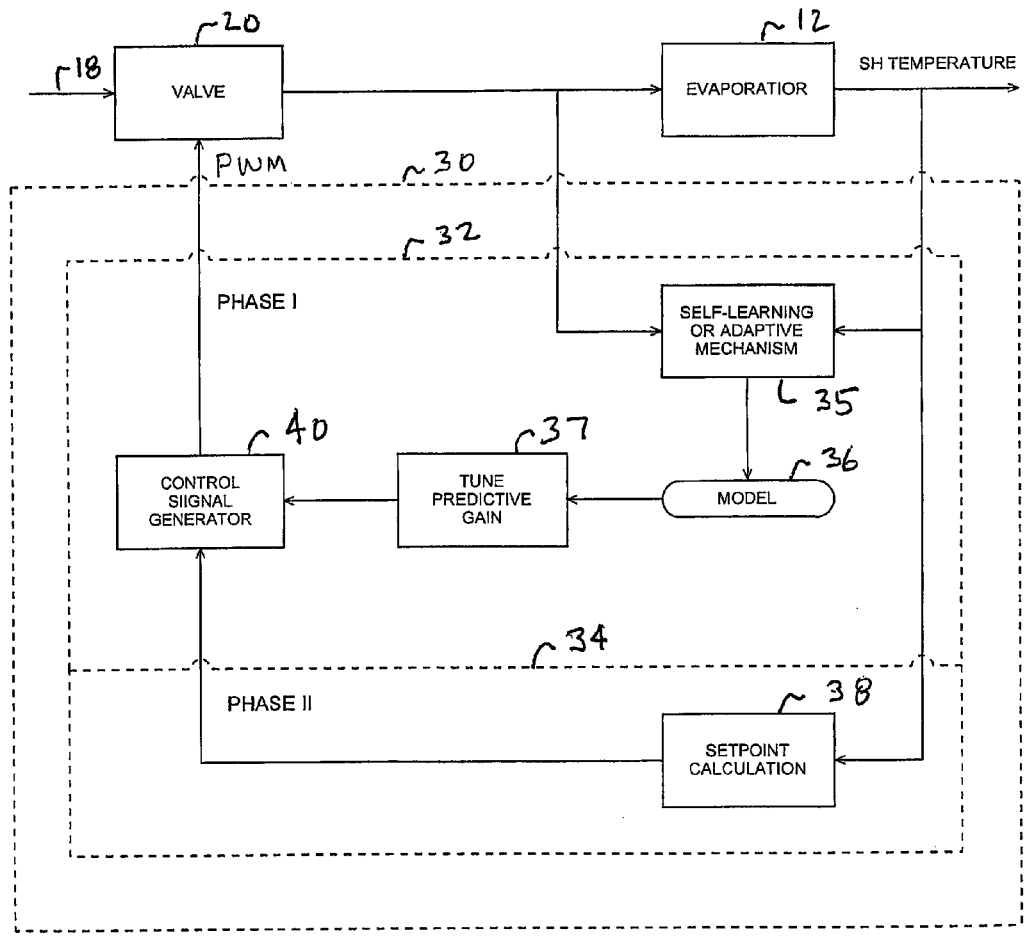
FIG. 2 is a schematic diagram for a HVAC system controller that is in accordance with the present invention.

Referring again to the drawings, there is illustrated, in FIG. 2, a two stage HVAC system controller 30 that is in accordance with the present invention. As mentioned above, the invention is illustrated as being applied to an HVAC system, and a portion of the HVAC system shown in FIG. 1 is again shown in FIG. 2. Any components in FIG. 2 that are similar to components shown in FIG. 1 have the same numerical identifiers. The first stage, or phase I, of the HVAC controller 30, which is labeled 32, is utilized to ensure a stable response around a set point and includes a predictive adaptive controller. The second stage, or phase II, of the HVAC controller 30, which is labeled 34, calculates a set point for the system as a function of the system operating data.

As the HVAC system runs, the HVAC system controller 30 periodically collects system input data, such as, for example, a command signal going to the valve 20 (which can be determined from the output of the valve 20 as shown in FIG. 2) and output data, such as, for example, superheat temperature at the exit of the evaporator 12 of the HVAC system 10. The system input data is supplied to a self learning, or adaptive, mechanism 35 that is operable to determine an optimal set point, i.e., a self adjusted set point that also is stable. The output from the self-learning mechanism 35 is supplied to an HVAC system model 36 that estimates operating parameters for the controlled system, such as, for example, time constant and system gain. The gains and other output from the system model 36 are tuned in the box labeled 37. The HVAC system controller 30 also generates a set point value, as determined by a set point calculation labeled 38 as a function of the superheat temperature. From the tuned estimated model output parameters and the calculated set point, a command signal generator 40 predicts the future response of the system and generates a corresponding command signal that is sent to the valve 20. The HVAC system controller 30 illustrated in FIG. 2 generates a Pulse Width Modulated (PWM) waveform signal with a variable duty cycle that is applied to the valve 20 as a control command. However, the invention also contemplates using other control commands than the PWM shown.

To accomplish the self learning processes, a well known Root Least Square (RLS) method is used in block 35. To perform the predictive mechanism, predictive functional control also is used in block 35. The main goal of the control algorithm is to ensure that a stable condition exists irrespective of load conditions. It has been observed that, when a control parameter, such as a superheat set point, is fixed, the system stability can be affected due to load conditions. For example, in the case of the HVAC system 10 illustrated in FIGS. 1 and 2, it is desired to maintain a stable, i.e., a relatively constant, amount of superheat in the refrigerant exiting the evaporation 12, regardless of changing load and environment conditions, so as to maintain optimum efficiency. Instead of all superheated vapor coming out of the evaporator 12 at a constant temperature, saturated vapor, or even slugs of liquid refrigerant may be passing a temperature gauge at the evaporator outlet, causing varying temperature indications. But if the temperature is constant, it may indicate that insufficient refrigerant is being supplied to the evaporator, so all is not only evaporated, but may be superheated too much. Superheated vapor removes less heat (British Thermal Units) from the air side of the evaporator than does a phase change from liquid, resulting in less cooling of the air in the evaporator. Therefore, it is desirable to reduce the superheat set point to reduce superheat, increase refrigerant flow, and increase efficiency. Accordingly, the second phase 34 of the HVAC system controller 30 is utilized to identify stability issues and address them to prevent the predictive-adaptive controller 30 from working in an unstable state. The possible system condition is identified by recognizing the current system state and then taking appropriate action based on the state. Below are definitions of each state that are utilized by the controller:

UNSTABLE: ((Number of oscillations around setpoint>Threshold) AND (Percentage of seconds outside the Set point range (+−1° C.));

DRIFT: Number of seconds outside the Set-point range (+−1° C.). Will be reset as soon as it enters the range;

INIT: Initialized state where the system has booted and we are ready to run the predictive adaptive algorithm;

OFF: System is OFF; and

STABLE: If the system is not drifting and unstable, then it is in a stable state.

The HVAC system controller 30 contemplates that both phases 32 and 34 run continuously, but at different rates, with the first phase 32 running a higher rate than the second phase 34. Thus, for example, the first phase 32 may have iterations of one second while the second phase 34 may have iterations of five minutes. It will be appreciated that the above iterations times are meant to be exemplary and that the invention may be practiced with other iteration time periods.

Figure 3:
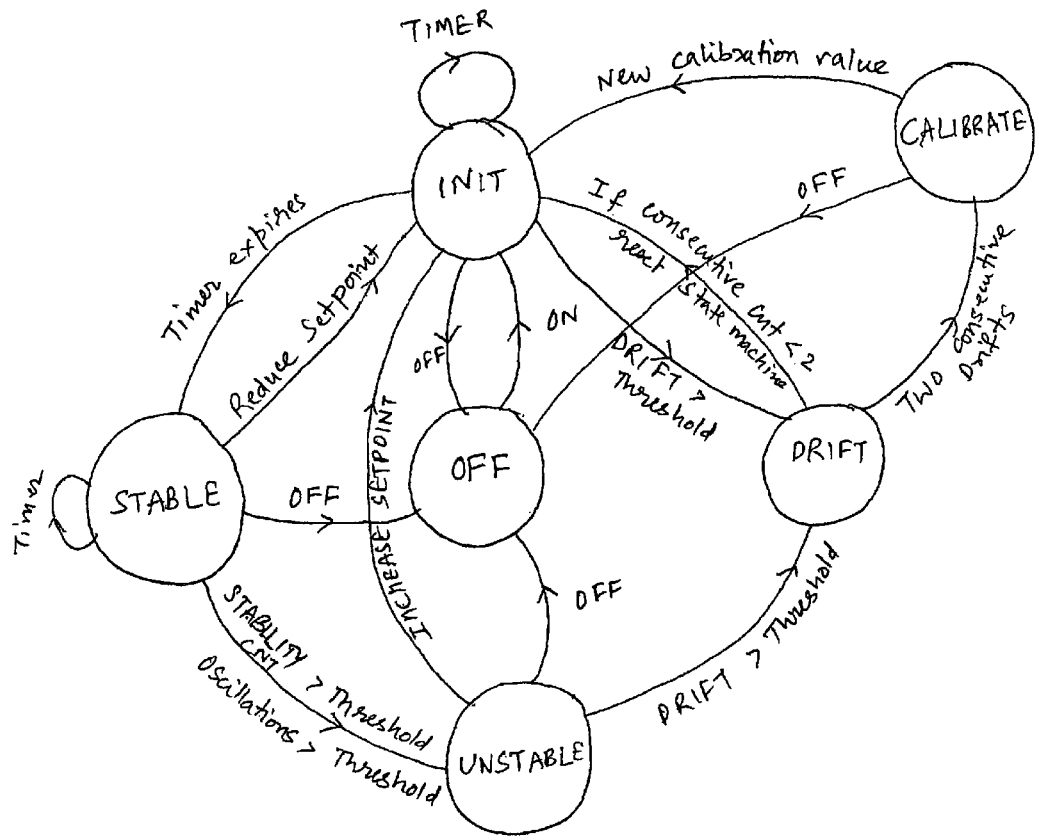
FIG. 3 is a state diagram for the HVAC system controller shown in FIG. 2.

The HVAC system controller 30 utilizes an algorithm that always starts in an 'INIT' state which is basically an initial reset-state of our algorithm. From the INIT-state data is collected over a time-period to determine the next state, and appropriate action is taken to transfer the system to the desired state. If it is determined that the system is in an 'UNSTABLE' state, the algorithm will increase the superheat set point to account for the instability. If it is determined the system is in a stable state for a long period of time, then the superheat setpoint is reduced to improve efficiency. As will be explained below, the stability of the system is determined by monitoring oscillations, variation and drift of the superheat temperature about the set point. The state machine is re-initialized when the system is turned OFF to assure that the HVAC system controller 30 is in a starting condition when the system is turned back ON. The interrelations between the states are illustrated by the state diagram shown in FIG. 3.

Figure 4:
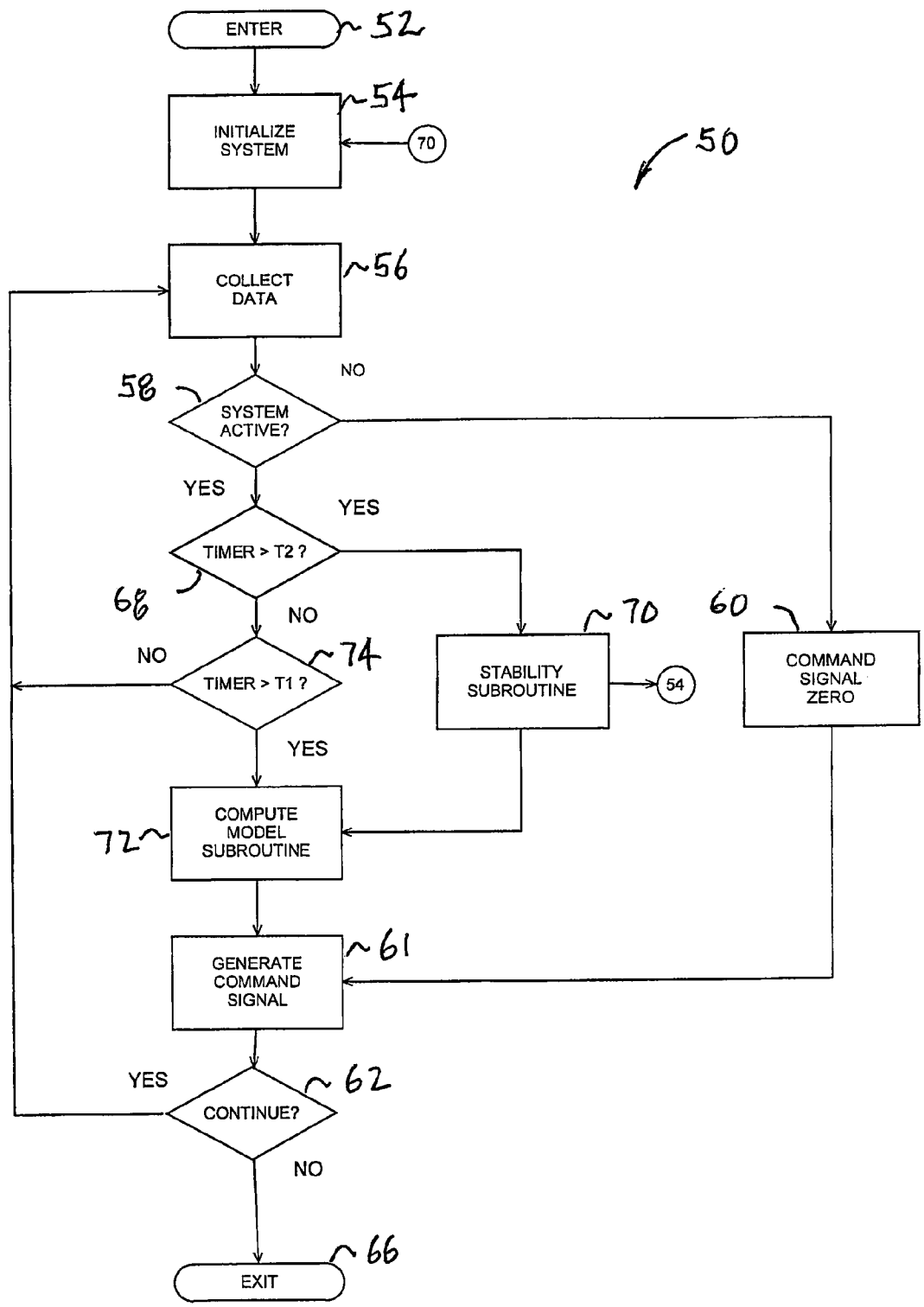
FIG. 4 is a flow chart for a control algorithm utilized in the HVAC system controller shown in FIG. 2.

Turning now to FIG. 4, there is shown a flow chart for an algorithm 50 for controlling a flow valve that is in accordance with an aspect of our novel method. The algorithm 50 is entered through block 52 and proceeds to functional block 54 where the algorithm, and the associated system, is initialized by setting all variables to stored initial values and setting all internal timers to zero. Included in the initialization would be an initial control parameter set point value, which for the HVAC system shown in FIG. 2 would be the superheat set point. The algorithm continues to functional block 56 where system data is collected. For the system shown in FIG. 2, the collected data would include the temperature and pressure at the outlet of the evaporator 12 that would allow determination of the degrees of super heat. The algorithm then advances to decision block 58.

In decision block 58, it is determined whether or not the system 10 is active, or ON. For the system shown in FIG. 2, the determination may consist of checking the motor compressor 16 for operation. If the system 10 is OFF, the algorithm 50 transfers to functional block 60 where the control command is set to zero. From block 60, the algorithm next proceeds to functional block 61 to generate a command signal for the valve 20. In the preferred embodiment, the command signal is a Pulse Width Modulated (PWM) signal with a variable duty cycle, with the duty cycle adjusted in functional block 61. Thus, for the zero command signal called for in functional block 60, the duty cycle of the PWM would be set to zero in functional block 61.

The algorithm then continues to decision block 62 and determines whether or not it should continue. If the algorithm is to continue, it transfers back to functional block 56 to collect more data. If, in decision block 62, the algorithm is not to continue, it exits through block 66.

Returning now to decision block 58, if it is determined that the system 10 is ON the algorithm 50 transfers to decision block 68. In decision block 68, an internal timer is compared to a second time limit T2, which is the length of time required to obtain enough data to determine whether or not the control parameter is stable. If the timer has reached the second phase time limit, the algorithm transfers to a stability subroutine 70 which is shown in detail in FIG. 6. As shown in FIG. 4, the algorithm 50 exits the subroutine 70 and proceeds either to functional block 54, where the system 50 is re-initialized with new parameters determined by the stability subroutine, or to functional block 72, where another subroutine computes an update for the adaptive predictive model 36, as shown in detail in FIG. 5. If, in decision block 68, the timer has not reached the second phase time limit, the algorithm transfers to decision block 74.

In decision block 74, the internal timer is compared to a first time limit T1, which is the length of time required to obtain enough data to run the compute model subroutine. If the timer has reached the first time limit T1, the algorithm transfers to functional block 72 where an update for the adaptive predictive model is computed from the system time constant and system gain settings. If the timer has not reached the first time limit T1, the algorithm transfers to functional block 56 to collect the next iteration of data. Typically, the algorithm computes an update for the model 36 during each iteration; however, the use of the first time limit T1 and decision block 74 provide an option of collecting data over several iterations before updating the adaptive predictive model 36. Once the adaptive predictive model has been updated, the algorithm 50 continues to functional block 61 to generate a command signal for the valve 20. After generating the command signal, the algorithm proceeds to decision block 62 where the algorithm determines whether or not to continue. If the decision is to not continue, the algorithm exits through block 66 while, if the decision is to continue, the algorithm returns to functional block 56 and continues as described above.

Figure 5:
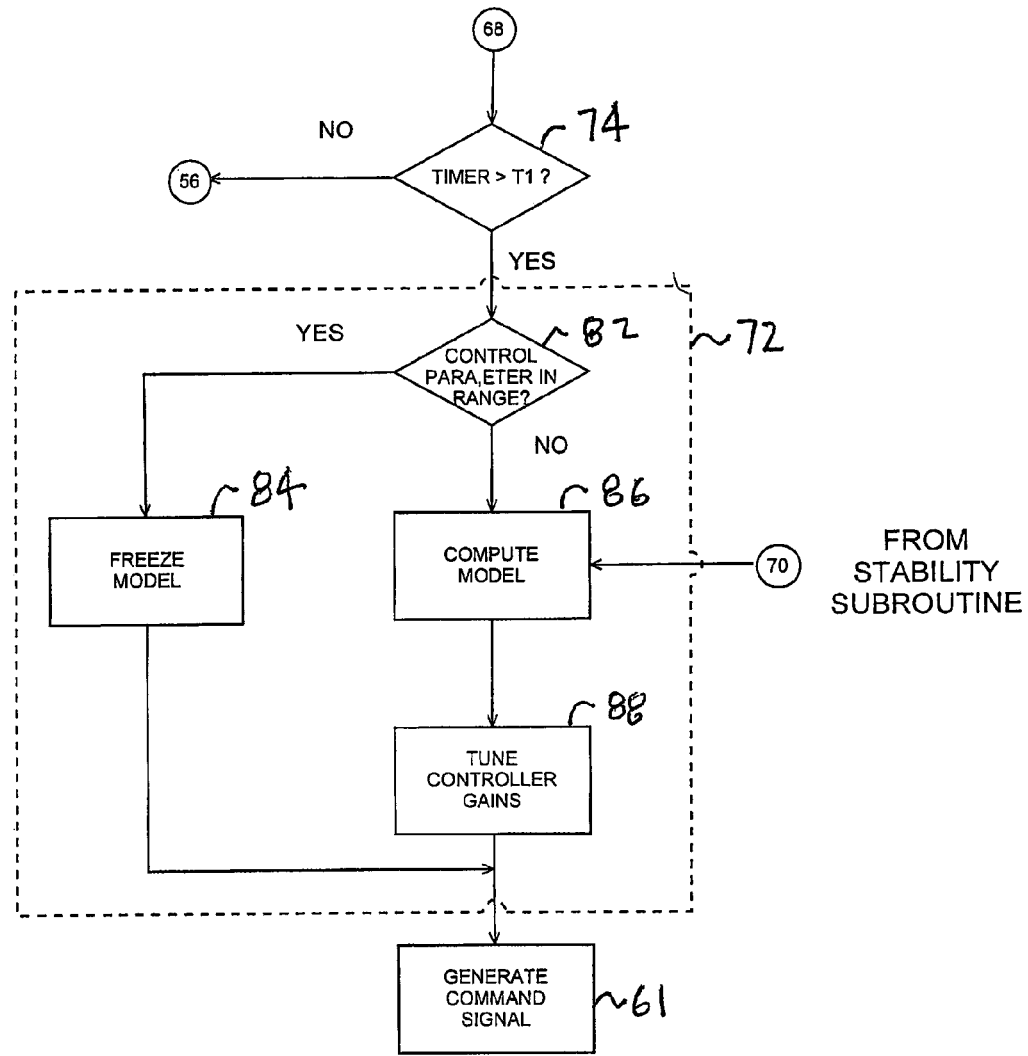
FIG. 5 is a flow chart for a modeling subroutine that is included in the control algorithm shown in FIG. 4.

Referring now to FIG. 5, there is shown a flow chart for the subroutine 72 that is utilized by the algorithm for updating the adaptive predictive system model 36. As shown in FIG. 5, the subroutine 72 is entered from decision block 74 when the first time limit T1 is reached and the algorithm proceeds to decision block 82. In decision block 82, the current control parameter is compared to an acceptable control parameter range. If the control parameter is within the acceptable range, the subroutine transfers to functional block 84 where the model is frozen and hence the controller gains are not updated. The subroutine 72 then continues to functional block 61 in the algorithm 50 and the algorithm 50 continues as described above. If, however, in decision block 82, it is determined that the control parameter is not within the acceptable control parameter range, the subroutine 72 transfers to functional block 86 where the model is computed with possible parameter value input from the stability subroutine 70. The subroutine 72 then proceeds to functional block 88 where the controller gains are tuned in accordance with the results obtained from the system model computation in functional block 86. Once the controller gains have been tuned, the subroutine 72 is exited to functional block 61 in the algorithm 50 and the algorithm 50 continues as described above.

Figure 6:
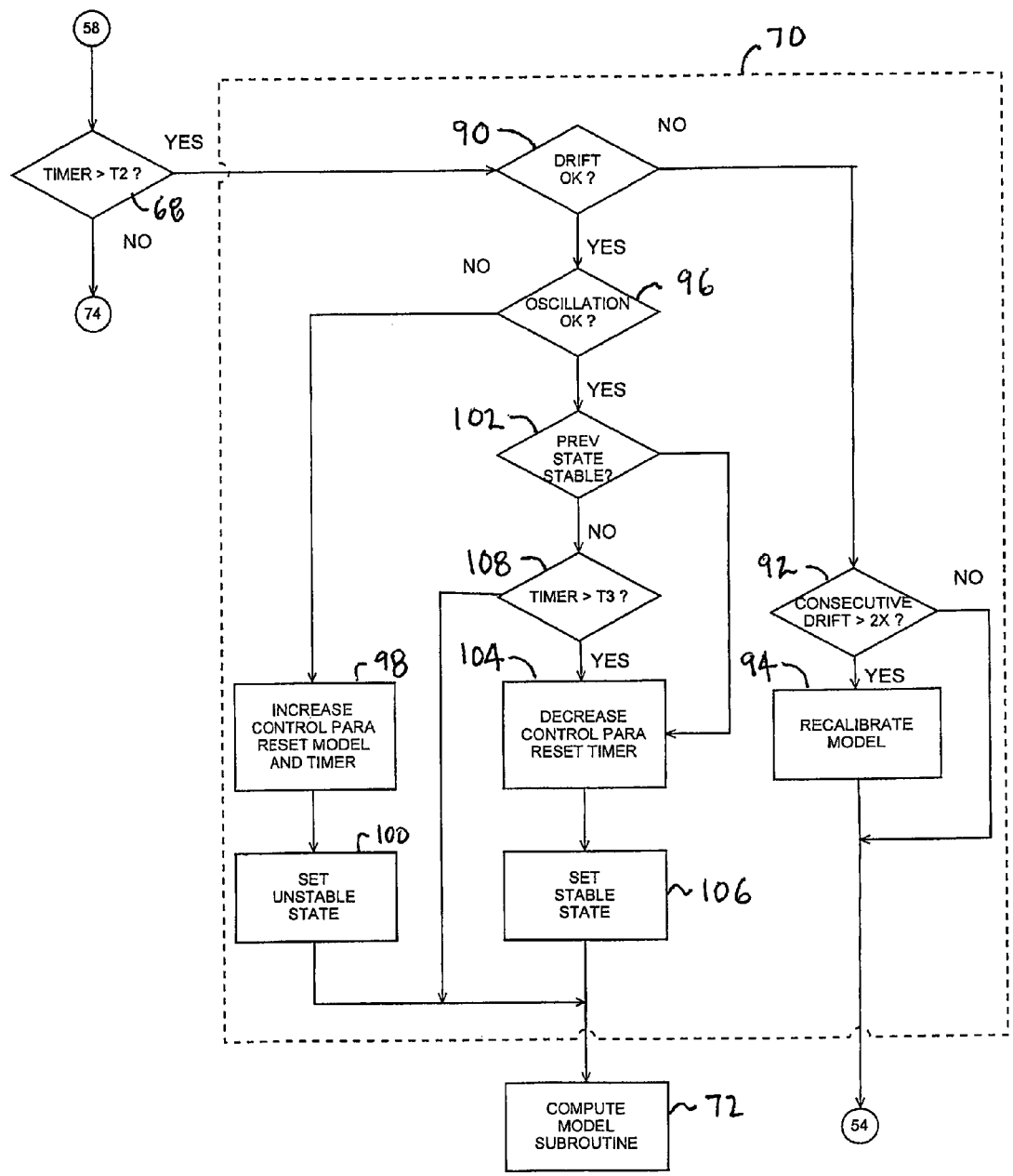
FIG. 6 is a flow chart for a stability subroutine that is included in the control algorithm shown in FIG. 4.
Figure 7:
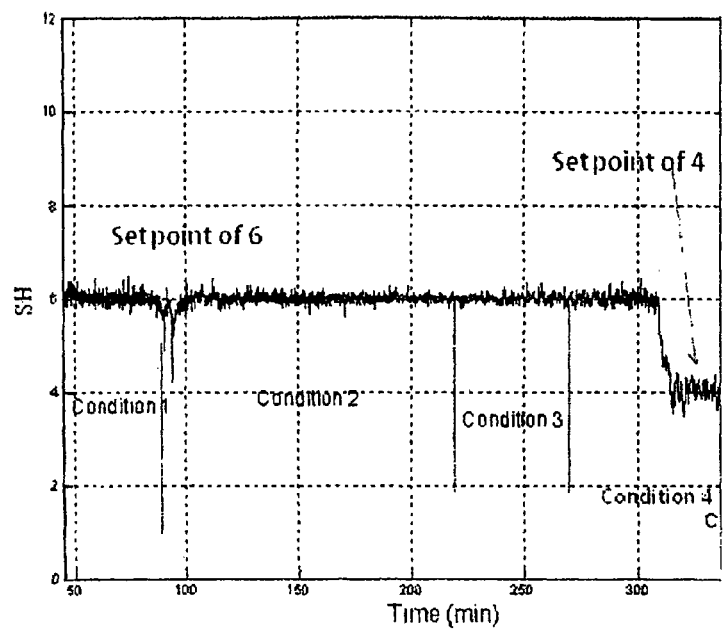
FIG. 7 is a graph and a chart illustrating an application of the HVAC system controller shown in FIG. 2 to an HVAC system.
Figure 10:
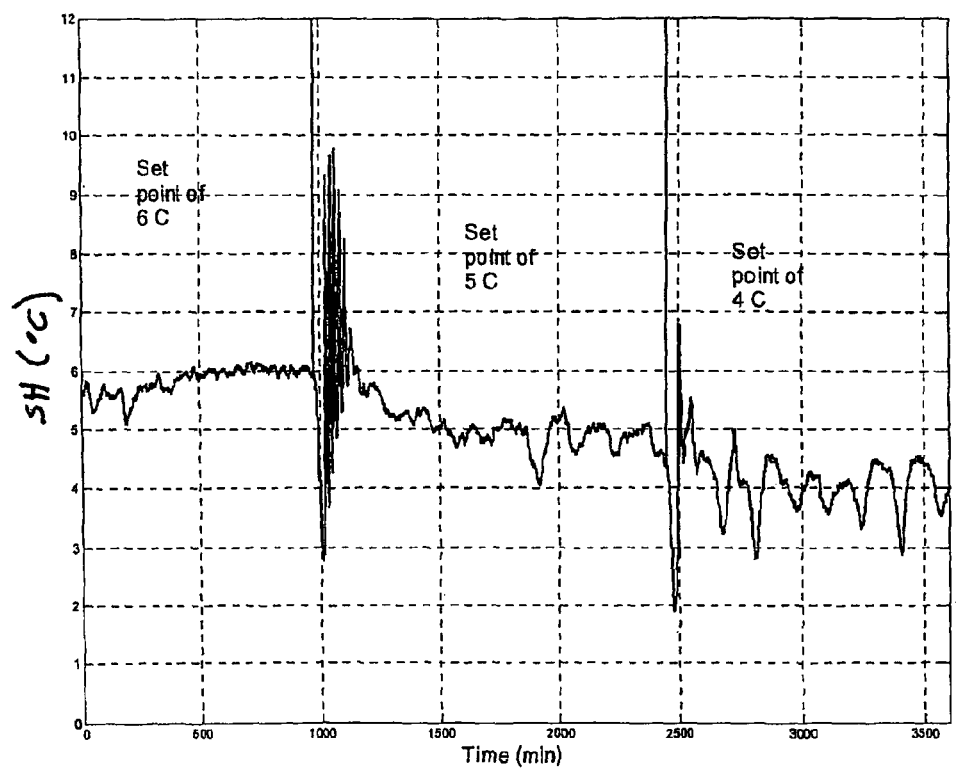
FIG. 10 is another graph illustrating an application of the HVAC system controller shown in FIG. 2 to an HVAC system.

Referring now to FIG. 6, there is shown a flow chart for the subroutine 70 that is utilized by the algorithm for updating the adaptive predictive model 36 with regard to control parameter stability. The subroutine 70 is entered when decision block 68 transfers to decision block 90 upon the timer exceeding the second time limit T2. In decision block 90 the drift of the control parameter, which is the superheat setpoint for the system 10 shown in FIG. 1, is compared to a drift threshold. If the setpoint exceeds the drift threshold, drift is not OK and the subroutine 70 transfers to decision block 92 where the duration of time that the control parameter has exceeded the threshold is checked. If the duration is greater than twice the second time limit T2, that is, two iterations of the time period for checking stability, the subroutine transfers to functional block 94 where the system model is recalibrated. The subroutine 70 then exits by returning to functional block 54 where the system is reinitialized, although with a recalibrated system model. If, on the other hand, the duration of time that the control parameter has not exceeded two iterations of the time period for checking stability, in decision block 92, the subroutine 70 is exited by a transfer directly to functional block 54 where the system is reinitialized, but without a recalibrated system model.

Returning now to decision block 90, if the drift is OK, the subroutine 70 transfers to decision block 96 where the number of oscillations of the control parameter about the set point are compared to an oscillation threshold. If the number of oscillations during the second time limit T2 exceeds the oscillation threshold, it is an indication that the control parameter is unstable, and the subroutine 70 transfers to functional block 98, where the control parameter is increased and the model and timer are reset. The subroutine 70 then continues to functional block 100 where an unstable state is set, typically by setting a flag. The subroutine 70 than returns to the main algorithm via functional block 72.

If, in decision block 96, the number of oscillations during the second time limit T2 does not exceeds the oscillation threshold, the subroutine transfers to decision block 102, where the system is checked with regard to being in a stable state. If it is determined that the previous state was stable, the subroutine 70 transfers to functional block 104 where the control parameter is decreased by an incremental amount. The subroutine continues to functional block 106 where a stable state is set, typically by setting a flag, and then to the main algorithm via functional block 72. If, in decision block 102, it is determined that the system previous state is not a stable state, the subroutine transfers to decision block 108 where the timer is compared to a third time limit T3, that is greater than the second time limit T2. If the timer has not reached the third time limit T3, the subroutine returns to the main algorithm via functional block 72. If, on the other hand, the timer has reached the third time limit T3, the subroutine transfers to functional block 104 and continues as described above.

It will be appreciated that the flow charts shown in FIGS. 4 through 6 are intended to be exemplary and that the invention also may be practiced with algorithms other than those shown in the figures.

EXAMPLE

The control algorithm of the present invention was implemented in a superheat controller in a testing program. A commercially available three ton HVAC unit and a 1.3 ton HVAC unit were used in testing. The superheat controller included microvalves to control flow of refrigerant into an evaporator. The system parameters and the predictive control gain were initialized to arbitrary values. The sampling time was one second with the controller updating the controller output with a valve command every second. The controller was able to control the HVAC unit superheat at different set points precisely with different load conditions as shown in FIGS. 7 through 10.

The advantages of an electronic superheat controller are numerous. The evaporator is always optimally filled with refrigerant. Even with large load variations, which mean an extremely wide range of partial-load operating conditions, exactly the right amount of refrigerant can be injected. This is done by constantly sensing the actual superheat value in the evaporator by means of a pressure transducer (labeled "P" in FIG. 1) and a very sensitive temperature sensor (labeled "T" in FIG. 1) and conveying this information to the controller in near real time.

With this information, the controller can act to achieve an optimally low superheat level. This adaptive regulation of refrigerant injection leads to optimal utilization of the evaporator and thus, to the highest possible evaporating pressure that can be achieved in the system concerned. This not only results in higher Coefficient Of Performance (COP) values, but also leads to energy savings because the COP value is equal to the cooling capacity divided by power consumption. The predictive controller system and method of this invention provide constant superheat optimization because the superheat always adjusts to a minimum stable signal of the evaporator, which reliably prevents any signal drift into an instable region.

The predictive controller system and method of this invention provide the following specific advances over prior art control systems:

Eliminate the operator need for tuning HVAC controller gains as is the case for conventional controllers used with electronic valves after initial configuration.

Difficulty of controlling the superheat for HVAC system as the system thermal load on the changes due to environmental conditions.

May be used in controlling the superheat for HVAC systems that include variable speed compressors that have slow time constants.

Enhancing HVAC system efficiency by running the HVAC system near to the minimum stable superheat line for the system.

While the predictive controller system and method of this invention provide have been illustrated and described above for a microvalve, or an array of microvalves, included in a HVAC system, it will be appreciated that the predictive controller system and method described herein also may be practiced for the control for other types of electronically controlled expansion valves that are included in systems other than a HVAC system or with other types of non-regulating valves. Thus, the invention also may be utilized to control non-microvalve type valves and may used to control electronically controlled valves in a variety of applications, including pressure control and flow control application.

In summary, an aspect of this disclosure deals with a method for controlling a system component. In a first step at least one system component that is operational to control an operating parameter of a system is provided. Next, at least one control parameter for the system component is sensed and the stability of the control parameter is determined. Then, a model for operation of the system that includes the control parameter is developed and utilized to tune a predictive controller, the predictive controller generating a control command for the system component, the control command including at least one operating parameter for the system component.

Another aspect of this disclosure deals with a device for controlling a system that includes at least one system component that is operational to control an operating parameter of the system and at least one sensor mounted within the system with the sensor operative to sense a control parameter for the system component. The device also includes a controller connected to the system component that is operative to monitor the at least one control parameter and to determine the stability of the control parameter. The controller also is operative to adjust the control parameter, as needed, as a function of the stability determination and to develop a model for operation of the system that includes the control parameter. The controller is further operative to utilize the system model to tune a predictive controller with the predictive controller being operative to generate a control command for the system component, where the control command including at least one operating parameter for the system component.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for controlling a system comprising the steps of:
   (a) providing at least one system component that is operational to control an operating parameter of the system;
   (b) sensing at least one control parameter for the system component;
   (c) determining the stability of the control parameter;
   (d) adjusting, as needed, the control parameter as a function of the stability determination in step (c);
   (e) developing a model for operation of the system that includes the control parameter; and
   (f) utilizing the model developed in step (e) to tune a predictive controller, the predictive controller generating a control command for the system component, the control command including the at least one control parameter for the system component, wherein:
   the system component is a valve that is operational to control the flow of a substance through a conduit, the conduit is included in a Heating, Ventilating and Air Conditioning (HVAC) system, the valve is a microvalve, and the control parameter is a superheat temperature set point.

2. The method according to claim 1 wherein steps (b) through (f) are repeated periodically.

3. The method according to claim 1 wherein steps (e) and (f) utilize a predictive adaptive controller.

4. The method according to claim 3 wherein the at least one control parameter included in the control command generated in step (f) includes at least one of a gain and a time constant.

5. The method according to claim 4 wherein the at least one control parameter included in the control command generated in step (f) includes both a gain and a time constant.

6. The method according to claim 5 wherein step (d) is carried out following a first time period and step (f) is carried out following a second time period with the second time period being less than the first period.

7. The method according to claim 6 wherein step (c) includes measuring the number of excursions outside an acceptable range for the set point during the first time period and further wherein, if the number of excursions outside the acceptable range exceeds a threshold, the at least one control parameter is increased.

8. The method according to claim 7 wherein step (c) further includes, upon the number of excursions outside the acceptable range for the set point being less that the threshold, continuing to measuring the number of excursions outside the acceptable range for the set point for a third time period that is greater than the second time period, and upon the number of excursions outside the acceptable range for the set point remaining less that the threshold, decreasing the at least one control parameter.

9. The method according to claim 8 wherein the threshold is a first threshold and, prior to step (b), the controller settings are initialized, and further wherein step (c) includes measuring the amount of time that the excursions of the set point are outside the acceptable range for the set point and, if the amount of time that excursions of the set point are outside the acceptable range for the at least one control parameter exceeds a second threshold, reinitializing the controller.

10. The method according to claim 9 wherein step (c) further includes measuring drift of the at least one control parameter relative to a drift threshold over a third time period that is greater than said first time period and, if the drift is greater than the drift threshold after the third time period expires, calibrating the model developed in step (d) accordingly.

11. The method according to claim 10 wherein the control command includes a pulse modulated wave with a variable duty cycle.

12. The method according to claim 1 wherein an array of microvalves is provided in step (a) and further wherein the control command generated in step (f) is applied to all of the microvalves in the array.

13. A device for controlling a system comprising:
at least one system component that is operational to control an operating parameter of the system;
at least one sensor mounted within the system, said sensor operative to sense a control parameter for said system component; and
a controller connected to said system component and said sensor, said controller being operative to monitor said at least one control parameter and to determine the stability of said control parameter, said controller also operative to adjust said control parameter, as needed, as a function of the stability determination and to develop a model for operation of the system that includes the control parameter, said controller further operative to utilize the model to tune a predictive controller, the predictive controller operative to generate a control command for the system component, the control command including the at least one control parameter for the system component, wherein:
the system component is a valve that is operational to control the flow of a substance through a conduit, the conduit is included in a Heating, Ventilating and Air Conditioning (HVAC) system, the valve is a microvalve, and the control parameter is a superheat temperature set point.

14. The device according to claim 13 wherein said controller is a predictive adaptive controller.

15. The device according to claim 14 wherein said control command includes at least one of a gain and a time constant.

16. A method for controlling a system comprising the steps of:
(a) providing at least one system component that is operational to control an operating parameter of the system;
(b) sensing at least one control parameter for the system component;
(c) determining the stability of the control parameter;
(d) adjusting, as needed, the at least one control parameter as a function of the stability determination in step (c);
(e) developing a model for operation of the system that includes the at least one control parameter; and
(f) utilizing the model developed in step (e) to tune a predictive controller, the predictive controller generating a control command for the system component, the control command including the at least one control parameter for the system component; wherein:
steps (e) and (f) utilize a predictive adaptive controller;
the at least one control parameter included in the control command generated in step (f) includes at least one of a gain and a time constant;
step (d) is carried out following a first time period and step (f) is carried out following a second time period with the second time period being less than the first period;
step (c) includes measuring the number of excursions outside an acceptable range for the set point during the first time period and further wherein, if the number of excursions outside the acceptable range exceeds a threshold, the at least one control parameter is increased;
step (c) further includes, upon the number of excursions outside the acceptable range for the set point being less that the threshold, continuing to measuring the number of excursions outside the acceptable range for the set point for a third time period that is greater than the second time period, and upon the number of excursions outside the acceptable range for the set point remaining less that the threshold, decreasing the at least one control parameter;
the threshold is a first threshold and, prior to step (b), the controller settings are initialized, and further wherein step (c) includes measuring the amount of time that the excursions of the set point are outside the acceptable range for the set point and, if the amount of time that excursions of the set point are outside the acceptable range for the at least one control parameter exceeds a second threshold, reinitializing the controller;
step (c) further includes measuring drift of the control parameter relative to a drift threshold over a third time period that is greater than said first time period and, if the drift is greater than the drift threshold after the third time period expires, calibrating the model developed in step (d) accordingly;
the system component is a valve that is operational to control the flow of a substance through a conduit;
the conduit is included in a Heating, Ventilating and Air Conditioning (HVAC) system;
the valve is a microvalve; and
the at least one control parameter is a superheat temperature set point.

17. The method according to claim 16 wherein an array of microvalves is provided in step (a) and further wherein the control command generated in step (f) is applied to all of the microvalves in the array.

* * * * *